April 5, 1932.  H. KRATZER  1,852,975
POULTRY WATERER
Filed April 27, 1931   2 Sheets-Sheet 2

Patented Apr. 5, 1932

1,852,975

UNITED STATES PATENT OFFICE

HERMAN KRATZER, OF ELLSWORTH, KANSAS

POULTRY WATERER

Application filed April 27, 1931. Serial No. 533,271.

This invention relates to a device for supplying drinking water to poultry and has for its primary object to provide an improved watering device wherein the various parts may be readily assembled and set up to provide a self feeding and drinking receptacle of a light structure and a portable nature.

A further object of the invention is to provide an improved drinking trough and a supply tank so associated and arranged that the tank will be charged to automatically discharge into the trough at proper intervals for replenishing the drinking water therein merely upon the elevation of the bottom of the drinking trough.

In the accompanying drawings:—

Figure 1:
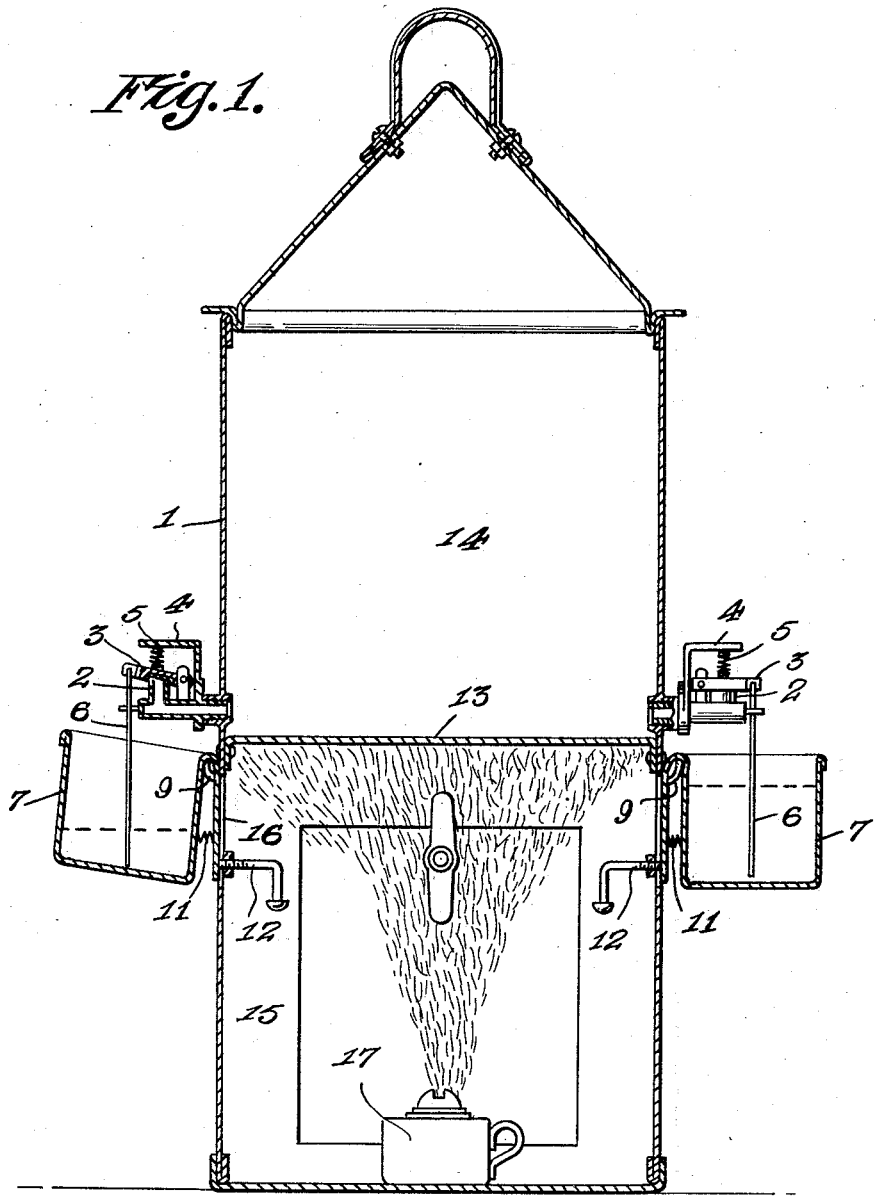
Figure 1 is a vertical sectional view of a tank with the watering device applied thereto.
Figure 2:
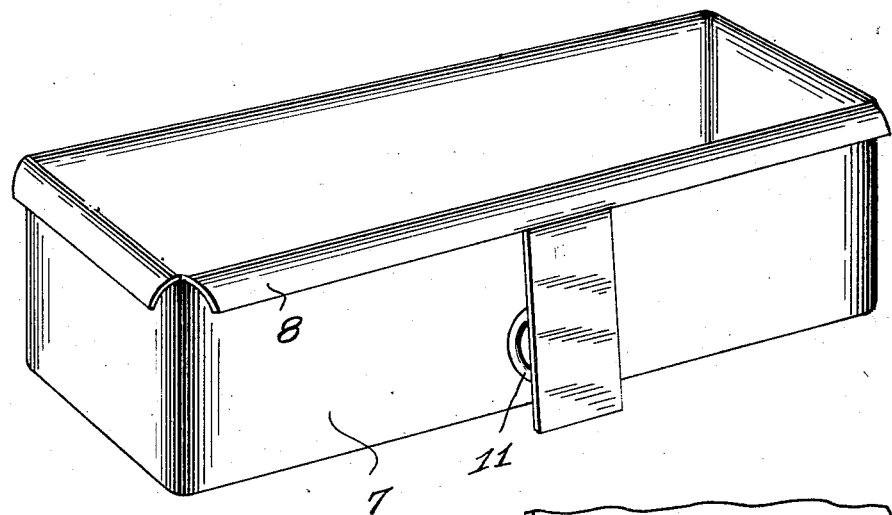
Figure 2 is a perspective view of the trough of the watering device.
Figure 3:
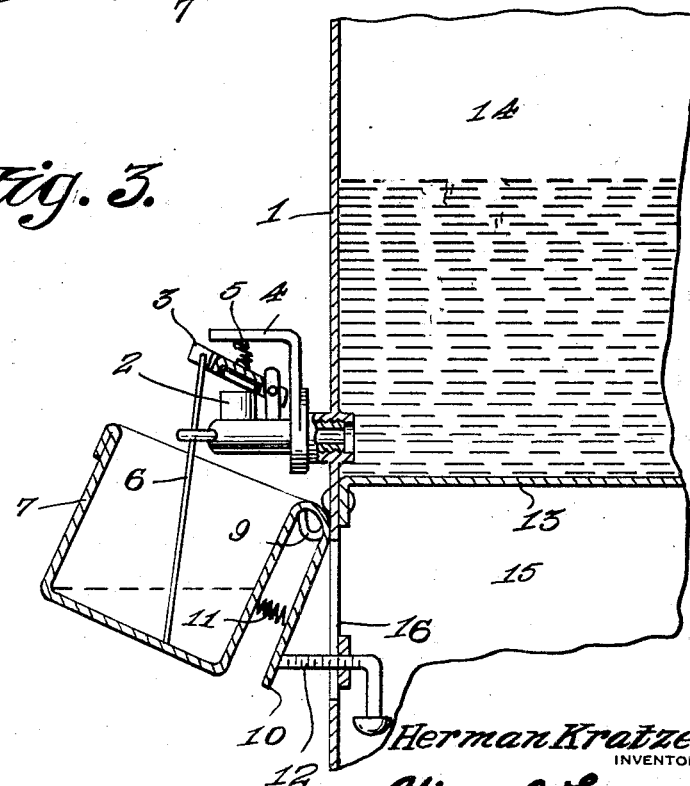
Figure 3 is an enlarged sectional view of the trough and adjacent parts of the tank.

As illustrated in the accompanying drawings the watering device comprises a tank 1 of usual form and adapted to hold a quantity of water. The tank 1 is provided with one or more spigots 2 each having a valve 3 for controlling the flow of water through the spigots. An arm 4 is located upon each spigot and a spring 5 is interposed between the arm and the valve 3 and serves to hold the valve in a closed position upon the spigots. A rod 6 depends from the free end of the valve 3 and the lower end of the said rod rests upon the bottom of the trough 7 when the said trough is at an elevated position as shown at the left in Figure 1 of the drawings. The trough 7 is provided with a flange 8 which is adapted to engage over hooks 9 provided at the side of the tank. The flange 8 provided with a leaf portion 10 adapted to lie at the side of the tank. A spring 11 is interposed between the rear wall of the trough and the leaf portion 10. A screw 12 passes through the wall of the tank and engages the end of the leaf portion 10.

When the trough 7 is empty or contains but little water the bottom thereof is elevated as shown at the left in Figure 1 of the drawings and the rod 6 is moved in an upward direction whereby the valve 3 is opened and water may flow from the tank 1 through the spigots into the trough 7. When the trough 7 becomes filled with water it swings down to the position as shown at the right in Figure 1 of the drawings whereby the lower end of the rod 6 is spaced above the bottom of the trough and the tension of the spring 5 comes into play thereby closing the valve 3 down upon the spigot 2 and thus interrupting the flow of water from the tank into the trough.

As the water is consumed from the trough the operation of refilling as above described is repeated. The spring 11 is an expansion spring and serves to hold the side of the trough at an angle to the leaf 10 when the trough is empty, or nearly so, as shown at the left in Figure 1 of the drawings. The flange 8 may flex or bend under the influence of the spring 11 or the weight of the water in the trough.

The interior of the tank 1 is divided by a partition wall 13 into a water chamber 14 and a heating chamber 15. The side walls of the heating chamber 15 are provided with openings 16. These openings 16 are located below the spigots which communicate with the interior of the water chamber. A lamp 17 or other heater may be placed in the chamber 15 and when lighted the heat ascends and strikes the partition wall 13 thus keeping the water in the chamber 14 from freezing and as the products of combustion escape from the chamber 15 through the openings 16 they pass around spigots 2 and prevent the water in the spigots from freezing.

Having described the invention what is claimed is:—

A poultry waterer comprising a tank having a spigot, a valve for controlling the flow of water through the spigot, a rod attached to the valve, a trough having at its edge a flange, supporting means for engaging the flange of the trough, and a spring bearing against the side of the trough and adapted to hold the bottom thereof toward the rod.

In testimony whereof I affix my signature.

HERMAN KRATZER.